Figure 4:
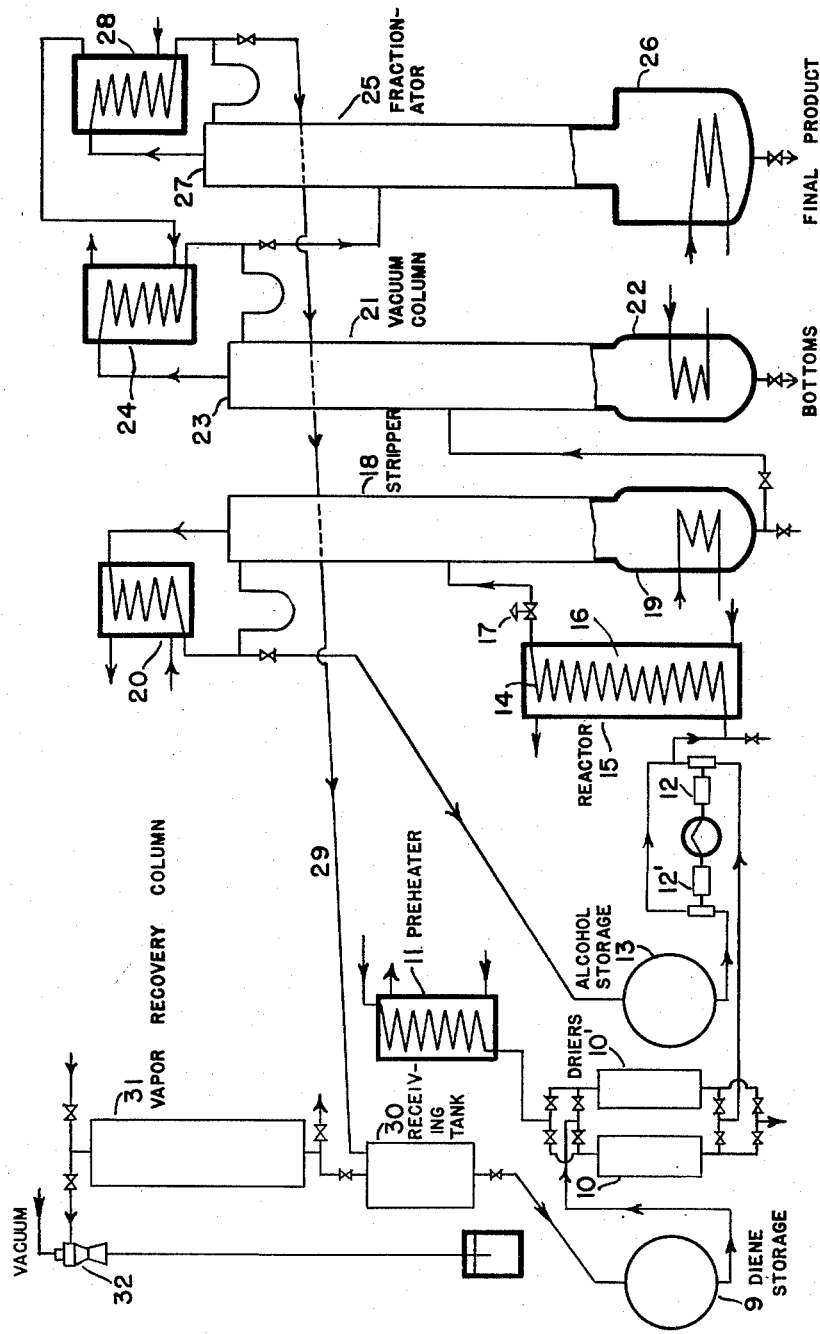

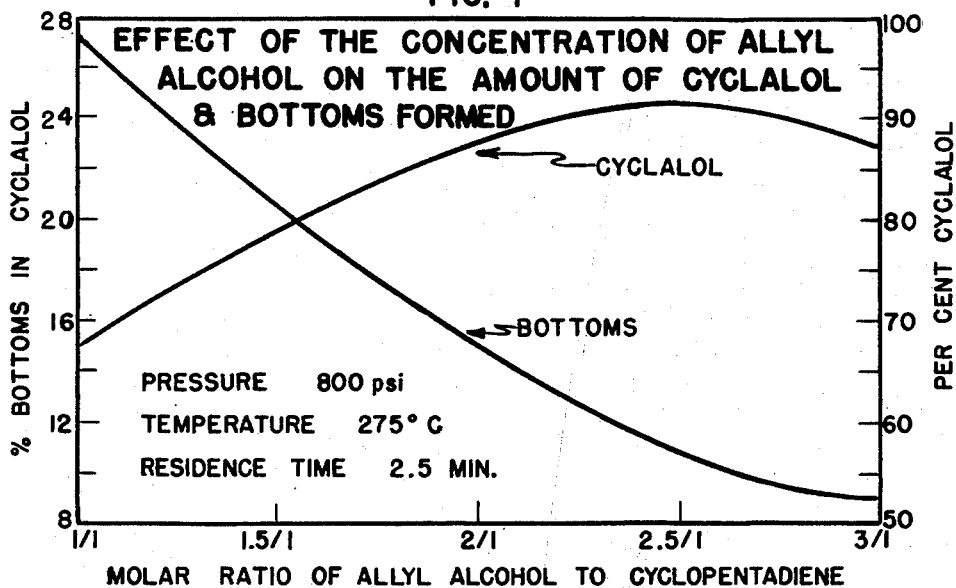
FIG. 1 — EFFECT OF THE CONCENTRATION OF ALLYL ALCOHOL ON THE AMOUNT OF CYCLALOL & BOTTOMS FORMED
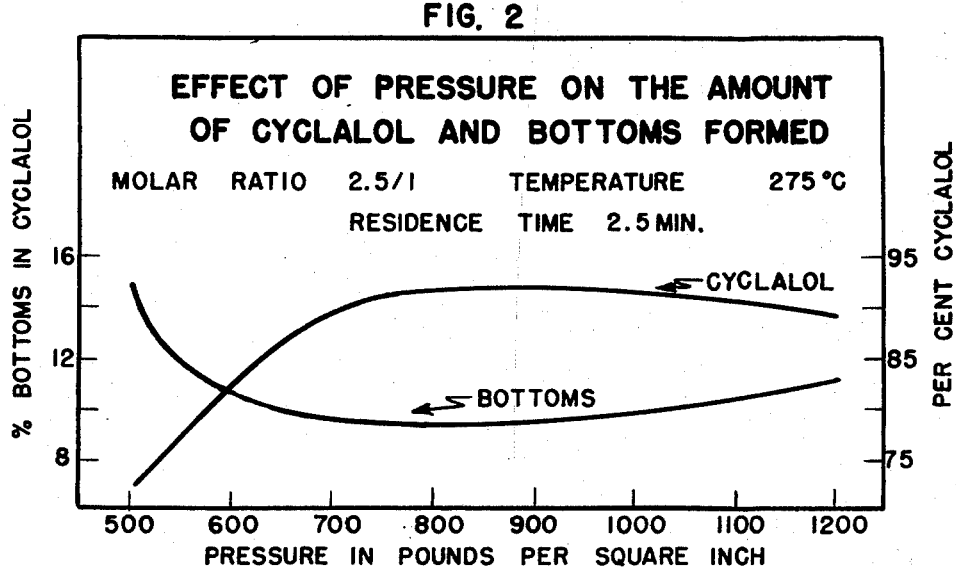
FIG. 2 — EFFECT OF PRESSURE ON THE AMOUNT OF CYCLALOL AND BOTTOMS FORMED
INVENTORS
V. S. DE MARCHI & J. NICHOLS

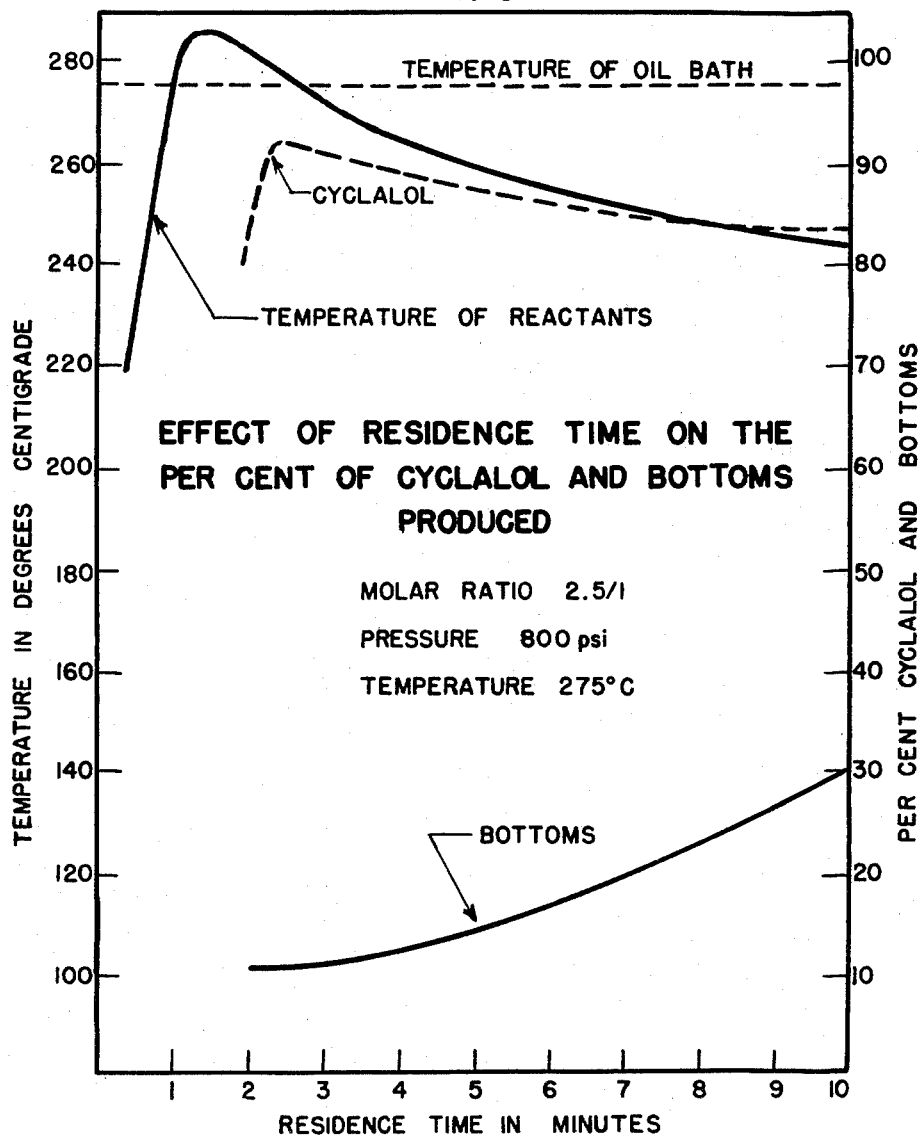

Patented May 13, 1952

2,596,279

UNITED STATES PATENT OFFICE 2,596,279

PROCESS FOR THE CONDENSATION OF AN ALLYLIC ALCOHOL AND A CONJUGATED DIENE

Joseph Nichols, Bronx, and Vincent S. De Marchi, Jamaica, N. Y., assignors to Interchemical Corporation, New York, N. Y., a corporation of Ohio Application December 30, 1950, Serial No. 203,632

4 Claims. (Cl. 260—617)

The present invention relates to the manufacture of condensation products and comprises a process whereby condensation products of allylic alcohols with conjugated dienes, such as cyclopentadiene, butadiene, isoprene, etc., may be prepared on a continuous basis, with increased yields and with a remarkably reduced reaction time.

This application is a continuation-in-part of our co-pending application Serial No. 773,400, filed September 11, 1947, now abandoned.

Heretofore, 2,5-endomethylene $\Delta^3$ tetrahydrobenzyl alcohol, for example, had always been prepared according to the batch system, since the requirements of time and temperature apparently necessitated the use of an autoclave for the reaction. According to U. S. Patent No. 2,352,606, approximately equimolar parts of allyl alcohol and pure cyclopentadiene were heated, for 11 hours, to 175–180° C. The yield, obtainable under the above conditions, amounted to only about 55 to 60 per cent of the theoretical. This relatively low yield at which the 2,5-endomethylene $\Delta_3$ tetrahydrobenzyl alcohol is obtained is due to the formation of large quantities of so-called "bottoms" the formation of which is caused by side reactions taking place during the condensation process.

Now we have discovered that it is possible to obtain 2,5-endomethylene $\Delta^3$ tetrahydrobenzyl alcohol, for instance, in yields of 90 per cent and better, by reducing the time allowed for the condensation to a fraction of that heretofore considered essential, by using a large excess of the allyl alcohol and by condensing at increased, but closely controlled temperatures and pressures in a continuously operating system. We found, furthermore, that it is unnecessary, in this instance, to use the pure cyclopentadiene. Commercial dicyclopentadiene will serve equally well, since, under the here disclosed conditions, the dicyclopentadiene is efficiently cracked to the monomer which then condenses with the allyl alcohol.

We obtain these results by means of a continuous reaction, in feeding the reactants at a measured rate into a coil, and in maintaining, at the same time, a pressure within the said coil which is in excess of the pressure equivalent of the temperature to which the material is being heated.

The efficiency of the formation of condensation products of this type was found to be contingent upon the correlation of four interdependent factors: the ratio of the reactants, the contact time, the reaction temperature, and the pressure exerted upon the reaction mixture. To illustrate the interdependence between the yields on the one hand and the enumerated four variables on the other, we established, for instance, the following optima for the preparation of 2,5-endomethylene $\Delta^3$ tetrahydrobenzyl alcohol:

(a) Molecular ratio between allyl alcohol and cyclopentadiene: between 2 to 1 and 3 to 1.

(b) Residence time: between 2½ and 10 minutes.

(c) Reaction temperature: 250–300° C.

(d) Reaction pressure: in excess of 600 lbs. per square inch.

For a full understanding of the invention, reference is made to the accompanying drawings, wherein the Figs. 1, 2 and 3 illustrate in form of graphs the effect of the said interdependent conditions upon the formation of the condensation products in question and Fig. 4 shows an embodiment of the continuously operating system.

The expression "cyclalol" which is employed on the drawings and in the herein following description is a term used to designate the monomeric condensation product between equimolar parts of cyclopentadiene and allyl alcohol (2,5-endomethylene $\Delta^3$ tetrahydrobenzyl alcohol).

Referring more particularly to the graph shown in Fig. 1, it is apparent that, at a given pressure, temperature and residence time of the reactants in the continuous system, the amount of cyclalol obtained increases for some time with an increase in the molar ratio between allyl alcohol and cyclopentadiene while, at the same time, the amount of undesirable bottoms decreases. At the stated conditions the highest yield of cyclalol is obtained at a ratio of 2.5 mols allyl alcohol per 1 mol of cyclopentadiene.

If the molar ratio between allyl alcohol and cyclopentadiene is increased further, to, say, 3 to 1, in order to attain similar optimum conditions for the production of cyclalol at the same yield, the temperature must be lowered from 275° C. to 250° C. and the residence time extended from 2.5 minutes to 10 minutes. It will be apparent that any further reduction in the temperature would call for a greatly lengthened residence time and a further increase in the ratio between the two reactants, which would eliminate the advantages of a continuous system and, because of the necessary subsequent removal of a great excess of allyl alcohol, seriously impair the efficiency of the procedure.

Since the rate at which dicyclopentadiene is cracked into the monomer decreases rapidly with a reduction in the temperature, if dicyclopentadiene is used for the making of cyclalol according to the herein described procedure, temperatures below 250° C. are inapplicable.

About 300° C. is the upper temperature limit; there is a rapid decrease in the cyclalol yield and an untoward increase in bottoms if a temperature of 300° C. is exceeded.

The graph in Fig. 2 illustrates the changes in yield as a result of variations in pressure exerted upon the reaction mixture. Practically no cyclalol forms if, at the other stated reaction conditions, a pressure of less than 500 lbs. per square inch is employed. The yield increases rapidly with pressure increases up to about 800 lbs. per square inch. and from there on remains practically constant. It is noteworthy that the amount of bottoms formed is extremely high at pressures below 500 lbs. per square inch, but decreases rapidly to a minimum of less than 10 per cent at pressures between 700 and 900 lbs. per square inch.

Fig. 3 explains the interrelationship between the per cent of recoverable cyclalol and the amounts of bottoms formed during various residence times at a given molar ratio, pressure and temperature of the heating medium.

The graph shows that the reaction resulting in cyclalol is a very rapid one, as indicated by the short residence time of 2.5 minutes at which the per cent cyclalol curve reaches its peak and that the reaction is accompanied by the evolution of considerable amounts of heat. Moreover, the graph reveals the new and hitherto unexpected fact that, after the cyclalol formation has been substantially completed, a sharp break occurs in the temperature curve, indicating a change from an exothermic reaction to an endothermic process. Almost simultaneously therewith the amount of cyclalol decreases while the amount of bottoms formed increases rapidly. Thus, the exposure of newly formed cyclalol to further heat and pressure causes changes resulting in the formation of undesirable bottoms. For a maximum recovery of cyclalol the reaction mixture should be withdrawn from the enclosed system when reaching the highest temperature. It will be obvious from the foregoing and from the statements made in reference to Fig. 1 that, if the residence time were to be extended to a period of, say, 20 minutes, cyclalol of the purity and at the yield as herein disclosed could not be obtained. Aside from the necessity of a large increase in the molar ratio between allyl alcohol and cyclopentadiene, as a result of the drastic temperature reduction which would be required, the formation of cyclalol would fall off to a fraction of the amount obtained under the foregoing conditions while the amount of bottoms would be greatly increased.

In Fig. 4, 9 represents a storage tank for commercial dicyclopentadiene. This material, say a commercial grade product having 92 per cent dicyclopentadiene and containing an appreciable amount of moisture, is transferred to one of the alternately operative driers 10 or 10', containing a desiccant, such as anhydrous calcium sulfate, which can easily be regenerated, by hot air for instance, which is passed from preheater 11 through the said driers.

Simultaneously with feeding the dried dicyclopentadiene to the operating lateral 12 of a twin proportioning pump 12, 12', allyl alcohol from tank 13 reaches the operating lateral 12' of the proportioning pump. This pump feeds, continuously and at a measured rate of speed, a mixture of the two materials into the coil 14 of the reactor 15, the said mixture consisting, in the present case, of two to three molar equivalents of allyl alcohol and an amount of commercial dicyclopentadiene equal to one molar equivalent of cyclopentadiene. The reactor comprises the aforementioned coil, preferably made from heavy steel tubing, having dimensions adequate to permit retention of the reactants therein for the required length of time. Said dimensions depend, aside from the immediate reaction requirements, upon the material of the coil, its wall thickness and its properties of heat transfer. This coil is surrounded by a heating medium 16, such as a bath of oil or other suitable liquid of high boiling point from which heat is transferred into the interior of the coil to heat the reaction mixture moving through the coil and to maintain it close to a specified reaction temperature for at least part of the time during which it resides therein (250° to 300° C. in the present case).

The rate of flow and the pressure at which the reaction mixture is kept within the coil is controlled by a pressure regulator 17, jointly with regulating the speed and pressure of the proportioning pump. A proper throttling of this regulator creates the desired back pressure against the working pump (800 lbs. per square inch in the case at issue and, generally, from 600 up to 1500 lbs. per square inch), permitting, at the same time, the discharge of the reacted material at the necessary pressure drop. The mixture consists, at this point, of the unsaturated alcohol-diene condensation product, an excess of unreacted alcohol, some unreacted diene and a small amount of heavy bottoms (comprising higher polymers of cyclopentadiene, some dicyclopentadiene, reaction products of cyclalol with additional amounts of cyclopentadiene, and residues such as were present in the commercial grade dicyclopentadiene). In order to separate the constituents of the mixture from each other, the material which has been discharged from the reactor, is transferred to a stripper 18. Maintaining a temperature in reboiler 19 which is in excess of the boiling temperature of allyl alcohol (B. P. 96.6° C.), permits to distill off the unreacted portion of the latter. The allyl alcohol vapors are reduced to the liquid stage in condenser 20, situated on top of the stripping column, and are recycled to the storage tank 13.

If it should be desired to remove the small amounts of heavy bottoms formed during the condensation, the hot residual from the allyl alcohol stripper is transferred into a vacuum column 21, where, by means of reboiler 22 and the application of vacuum at 23 a temperature-vacuum balance is maintained whereby the condensation product and any unreacted diene is volatilized and the heavy bottoms are retained in liquid form in the reboiler, to be taken out at the end of the run. (In the present case, a temperature of 149° C. is maintained at the base, together with a vacuum of about 27 to 28 inches).

The vapors, after having been liquified in a condenser 24, are drawn, by means of vacuum, into a fractionator 25, where the final product is freed from any unreacted diene by means of a temperature-vacuum equilibrium (in the present case 118° C./2–3 inch mercury) in heating the reboiler 26 and applying vacuum at 27. While the final product is collected in the reboiler from where it is taken at the end of the run, vapors of the unreacted diene are drawn from the column and, after reduction thereof to the liquid stage in condenser 28, are carried through a vacuum line 29 to a receiving tank 30, the latter being connected with tank 9. In order to prevent any losses through vapors which may be carried along toward the vacuum source, a vapor recovery column 31, having a charge of steam-regenerable, activated carbon is inserted between the receiving tank and the vacuum source 32.

Whereas, in accordance with the present disclosure, the allyl alcohol excess is eliminated from the resulting reaction mixture, after such removal the product is useful for various purposes, such as for the making of printing inks and surface coatings, without the necessity of removing the small amount of bottoms present. In this the herein disclosed cyclalol differs radically from products of prior processes which resulted in material highly contaminated with heavy bottoms. The following will demonstrate the difference:

(a) Maleic ester prepared from the reaction product of 2.5 mols allyl alcohol and 1 mol cyclopentadiene, obtained after a residence time of 2.5 minutes at 800 lbs. per square inch pressure in a continuous reactor heated to 275° C. and removing excess allyl alcohol from the reaction product, has a viscosity of 32 poises. The ester can be heat-bodied to any desired viscosity.

(b) Maleic ester prepared from the reaction product of 2.5 mols allyl alcohol and 1 mol cyclopentadiene, obtained after heating for 6 hours in an autoclave to 150°–160° C. and removing excess allyl alcohol from the reaction product, has a viscosity of approximately 7500 poises. The ester is far too high in viscosity to be useful for the making of printing ink or surface coatings.

The maleic esters were prepared from maleic anhydride and a quantity of the reaction product sufficient to provide a five per cent excess over the theoretically required amount of hydroxyl. The esterification was carried out by the azeotropic method using five per cent xylene. After completion of the reaction, xylene and volatile components were removed by means of a vacuum distillation for two hours at 195° C./2 mm. of mercury.

We claim:

1. A process for preparing a condensation product of an allylic alcohol and a conjugated diene, comprising commingling two to three mol equivalents of the allylic alcohol with one mol equivalent of the conjugated diene, continuously introducing the commingled reactants into a confined system, subjecting them to the action of heat from 250° to 300° C. and a pressure within the range of 600 to 1500 lbs. per square inch which exceeds the pressure equivalent created in the said system by heat alone, continuing said action of heat and pressure for a period of time sufficient to react substantially all of the conjugated diene with the said alcohol, continuously withdrawing reacted material from said system, separating the unreacted portion of the alcohol, removing high polymers of the diene which may have been formed during the reaction, and freeing the condensation product from any unreacted diene.

2. A process for preparing a condensation product of allyl alcohol and cyclopentadiene, comprising commingling two to three mol equivalents of allyl alcohol with one mol equivalent of cyclopentadiene, continuously introducing the commingled reactants into a confined system, subjecting them to the action of heat from 250° to 300° C. and a pressure within the range of 600 to 1500 lbs. per square inch which exceeds the pressure equivalent created in the said system by heat alone, continuing said action of heat and pressure for a period of time sufficient to react substantially all of the cyclopentadiene with allyl alcohol, continuously withdrawing reacted material from said system, and separating the unreacted portion of the allyl alcohol.

3. A process for preparing a condensation product of allyl alcohol and cyclopentadiene, comprising commingling two to three mol equivalents of allyl alcohol with one mol equivalent of cyclopentadiene, continuously introducing the commingled reactants into a confined system, subjecting them, for 2 to 10 minutes, to the action of heat of about 250° to 300° C. and a pressure within the range of 600 to 1500 lbs. per square inch which exceeds the pressure equivalent created in the said system by heat alone, continuously withdrawing reacted material from said system, separating the unreacted portion of the allyl alcohol, and removing high polymers of the cyclopentadiene which may have been formed during the reaction.

4. A process for preparing a condensation product of allyl alcohol and cyclopentadiene, comprising commingling two to three mol equivalents of allyl alcohol with an amount of commercial grade dicyclopentadiene equal to one mol equivalent of cyclopentadiene, continuously introducing the commingled reactants into a confined system, subjecting them to the action of heat of about 250° C. and a pressure of about 800 lbs. per square inch which exceeds the pressure equivalent created in the said system by heat alone, continuing said action of heat and pressure for a period of time sufficient to react substantially all of the cyclopentadiene with allyl alcohol, continuously withdrawing reacted material from said system, separating the unreacted portion of the allyl alcohol, removing high polymers of the cyclopentadiene which may have been formed during the reaction, and freeing the condensation product from any unreacted dicyclopentadiene.

JOSEPH NICHOLS.
VINCENT S. de MARCHI.

REFERENCES CITED

The following references are of record in the file of this patent:

UNITED STATES PATENTS

| Number | Name | Date |
| --- | --- | --- |
| 2,352,606 | Alder et al. | July 4, 1944 |
| 2,415,453 | Thomas | Feb. 11, 1947 |